(12) United States Patent  (10) Patent No.: US 9,527,315 B2
Noguchi  (45) Date of Patent: Dec. 27, 2016

(54) DETECTOR APPARATUS FOR DETECTING NEAR END OF ROLL PAPER

(71) Applicant: FUJITSU COMPONENT LIMITED, Tokyo (JP)

(72) Inventor: Masaki Noguchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/482,104

(22) Filed: Sep. 10, 2014

(65) Prior Publication Data

US 2015/0085009 A1    Mar. 26, 2015

(30) Foreign Application Priority Data

Sep. 24, 2013 (JP) ................ 2013-197267

(51) Int. Cl.
| | | |
|---|---|---|
| *B41J 15/02* | (2006.01) | |
| *B41J 11/00* | (2006.01) | |
| *B41J 15/04* | (2006.01) | |
| *G01B 11/08* | (2006.01) | |

(52) U.S. Cl.
CPC ............ *B41J 11/0075* (2013.01); *B41J 15/04* (2013.01); *G01B 11/08* (2013.01); *B65H 2511/114* (2013.01); *B65H 2511/142* (2013.01); *B65H 2515/10* (2013.01); *B65H 2801/12* (2013.01)

(58) Field of Classification Search
USPC .................. 347/108; 242/536, 563
See application file for complete search history.

(56) References Cited

U.S. PATENT DOCUMENTS

| | | | | |
|---|---|---|---|---|
| 4,204,180 | A * | 5/1980 | Usui ................ | B65H 23/005 226/11 |
| 5,713,678 | A * | 2/1998 | Smith et al. .............. | 400/613 |
| 5,820,068 | A * | 10/1998 | Hosomi et al. ........... | 242/563 |
| 5,884,861 | A * | 3/1999 | Hosomi ............. | B26D 1/305 242/563 |
| 6,059,222 | A * | 5/2000 | Yuyama et al. .......... | 242/563 |
| 6,135,384 | A * | 10/2000 | Skelly et al. ............. | 242/563 |
| 6,502,784 | B1 * | 1/2003 | Sato .................. | B65H 26/08 242/348 |
| 6,517,025 | B1 * | 2/2003 | Budz ................ | A47K 10/3818 242/563 |
| 6,629,666 | B2 * | 10/2003 | Lee .................... | B65H 16/02 242/563 |
| 6,991,391 | B2 * | 1/2006 | Maruyama ................ | 400/613 |
| 7,507,045 | B1 * | 3/2009 | Harris et al. ............. | 400/613 |
| 7,549,814 | B1 * | 6/2009 | Arrington ............ | B65H 26/08 242/595.1 |
| 7,553,098 | B2 * | 6/2009 | Maekawa ........... | B41J 11/0075 242/563 |

(Continued)

FOREIGN PATENT DOCUMENTS

JP    2011-057435    3/2011

*Primary Examiner* — Matthew Luu
*Assistant Examiner* — Lily Kemathe
(74) *Attorney, Agent, or Firm* — IPUSA, PLLC (57) ABSTRACT

A detector apparatus includes a support unit having a support surface for supporting an outer circumferential surface of a roll, and a detector configured to detect a near end of the roll in response to both a change in an outer diameter or weight of the roll and a change in a relative position of an inner circumferential surface of the roll to the support surface.

6 Claims, 7 Drawing Sheets

(56) References Cited

U.S. PATENT DOCUMENTS

| | | | | |
|---|---|---|---|---|
| 7,648,098 B2* | 1/2010 | Goeking | ............ | A47K 10/3818 |
| | | | | 242/563 |
| 8,113,458 B2* | 2/2012 | Chaussade | ............. | B41J 15/042 |
| | | | | 242/563.2 |
| 8,240,593 B2* | 8/2012 | Ito | ........................ | B65H 16/021 |
| | | | | 242/563 |
| 8,672,567 B2* | 3/2014 | Tsugaru | ................ | B41J 15/042 |
| | | | | 242/348 |
| 8,807,475 B2* | 8/2014 | Rodrian | ................ | A47K 10/36 |
| | | | | 242/563.2 |
| 9,016,966 B2* | 4/2015 | Fujita et al. | ................ | 400/613.1 |
| 2004/0184858 A1* | 9/2004 | Maruyama | .................... | 400/103 |
| 2010/0247217 A1* | 9/2010 | Tsugaru | ................... | B41J 29/02 |
| | | | | 400/582 |
| 2011/0164913 A1* | 7/2011 | Tsugaru | ................ | B41J 15/042 |
| | | | | 400/582 |

* cited by examiner

DETECTOR APPARATUS FOR DETECTING NEAR END OF ROLL PAPER

BACKGROUND OF THE INVENTION

1. Field of the Invention

The disclosures herein relate to a detector apparatus and a printer having the detector apparatus embedded therein.

2. Description of the Related Art

Certain types of printers feed and print on roll paper (see Patent Document 1, for example). The printer disclosed in Patent Document 1 holds roll paper by supporting its core, and detects the near end of the roll paper based on the result of detecting the outer diameter of the roll paper without regard to a varying size of the core diameter.

The above-noted technology is based on the configuration in which the core of roll paper is supported. This technology is thus not applicable to a drop-in-type printer that employs a support unit for supporting the outer circumferential surface of a paper roll. Further, the detection of a near end (i.e., paper near end) does not take into account a difference in the inner diameter between different paper rolls.

Accordingly, it may be desirable to provide a near-end detector that detects a near end accurately while being applicable to a printer configured to support the outer circumferential surface of a paper roll, and to provide a printer that has such a near-end detector embedded therein.
[Patent Document] Japanese Patent Application Publication No. 2011-57435

SUMMARY OF THE INVENTION

According to an embodiment, a detector apparatus includes a support unit having a support surface for supporting an outer circumferential surface of a roll, and a detector configured to detect a near end of the roll in response to both a change in an outer diameter or weight of the roll and a change in a relative position of an inner circumferential surface of the roll to the support surface.

According to an embodiment, a printer includes a print head, a feed unit configured to feed roll paper to the print head, a support unit that supports the roll paper, having a support surface for supporting an outer circumferential surface of the roll paper, and a detector configured to detect a near end of the roll paper in response to both a change in an outer diameter or weight of the roll paper and a change in a relative position of an inner circumferential surface of the roll paper to the support surface.

According to an embodiment, a detector apparatus includes a support unit having a support surface that comes in contact with an outer circumferential surface of a roll to support the roll, and a detector configured to detect a first event that an outer diameter or weight of the roll is smaller than a threshold, to detect a second event that a distance between an inner circumferential surface of the roll to the support surface is smaller than a predetermined distance, and to produce an output indicative of a near end of the roll in response to concurrent occurrences of the first event and the second event.

According to at least one embodiment, the detector apparatus can accurately detect a near end in a printer configured to support the outer circumferential surface of a paper roll.

BRIEF DESCRIPTION OF THE DRAWINGS

Other objects and further features of the present invention will be apparent from the following detailed description when read in conjunction with the accompanying drawings, in which.

DESCRIPTION OF EMBODIMENTS

In the following, embodiments for carrying out the invention will be described by referring to the accompanying drawings.

Figure 1:
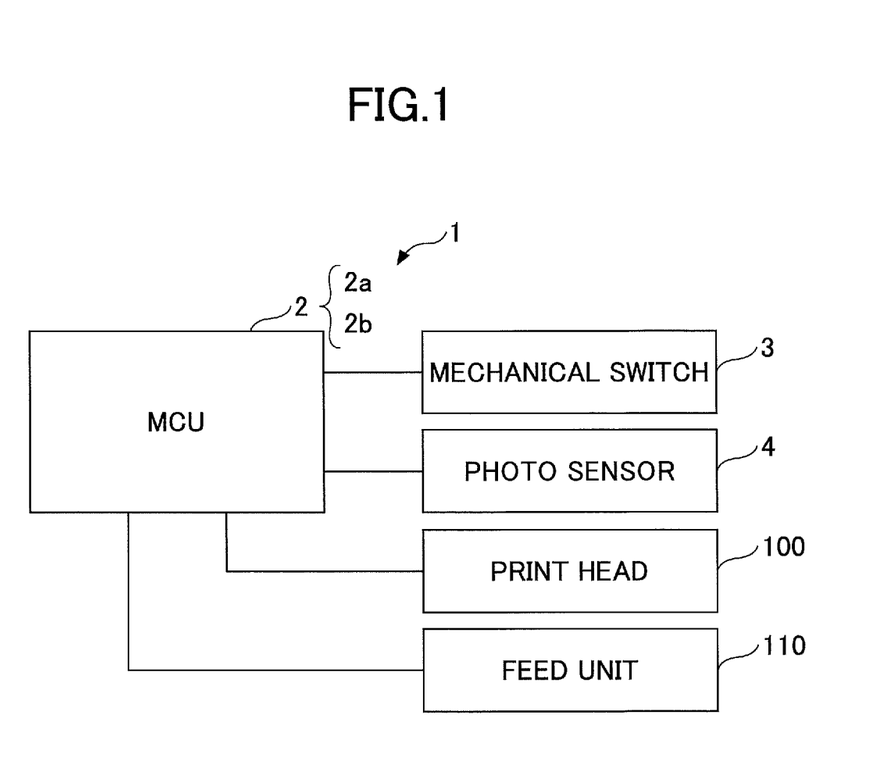
FIG. 1 is a drawing illustrating an example of a printer according to an embodiment.

As illustrated in FIG. 1, a printer of the present embodiment includes a main control unit (MCU) 2, a mechanical switch (an example of a first detecting unit) 3, a reflective-type photo sensor (an example of a second detecting unit) 4, a print head 100, and a feed unit 110. The main control unit 2, the mechanical switch 3, and the photo sensor 4 serve as a near-end detector apparatus 1 of the present embodiment. The feed unit 110 advances and feeds roll paper to the print unit 100, which then prints on the advanced portion of the roll paper. As the feed unit 110 feeds the roll paper to the print unit 100, the roll paper is consumed, resulting in the reduced amount of paper remaining in the roll. The near-end detector apparatus 1 detects the near end of the roll paper, i.e., detects the fact that the exhaustion or end of the roll paper is nearing or imminent.

Basic configurations of the mechanical switch 3 and the photo sensor 4 may be the same or similar to those known in the art. A description of functions of the mechanical switch 3 and the photo sensor 4 will be given by focusing attention to aspects relevant to the present embodiment.

The main control unit 2 includes a CPU, a ROM, a RAM, input and output interfaces, and a data bus connecting therebetween. The CPU performs predetermined processing in accordance with programs stored in the ROM. The main control unit 2 functions as a near-end detector 2a and a display unit 2b.

Figure 2:
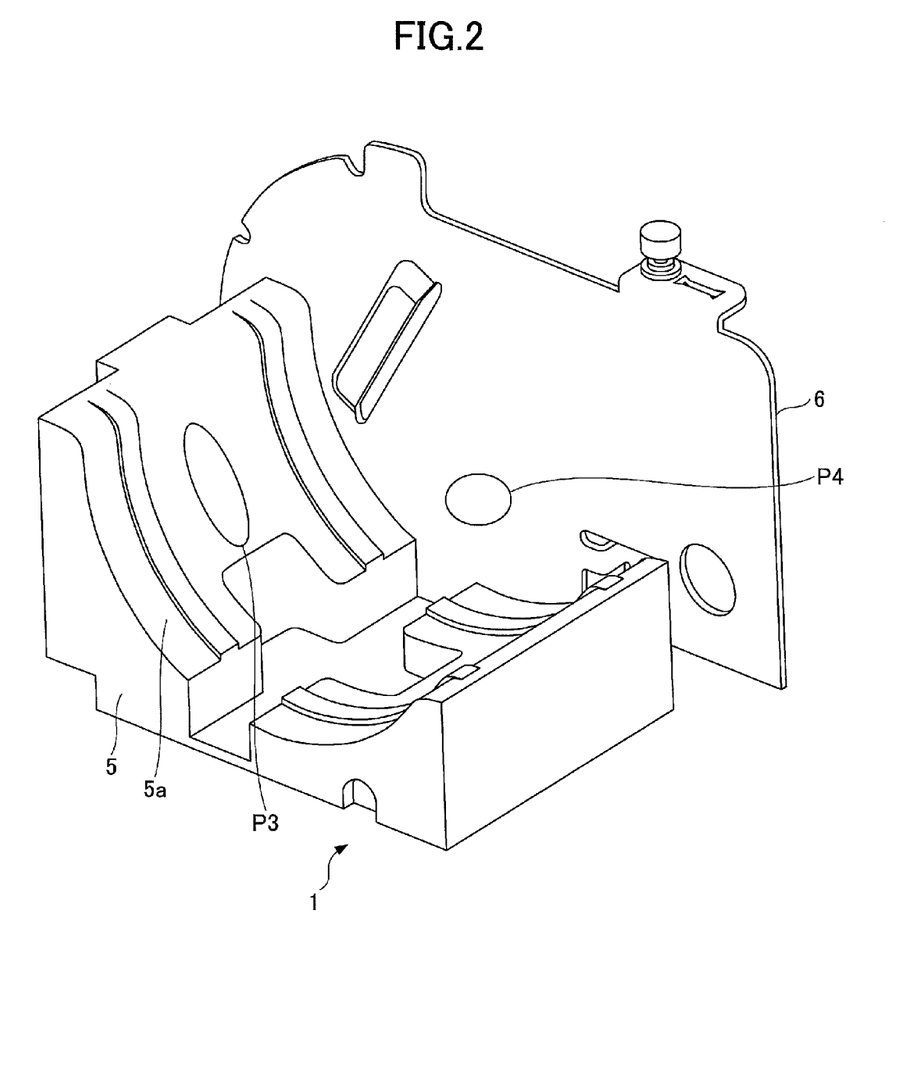
FIG. 2 is an oblique perspective view of a configuration relating to the placement of a mechanical switch and a photo sensor in the near-end detector apparatus according to the embodiment.
Figure 3:
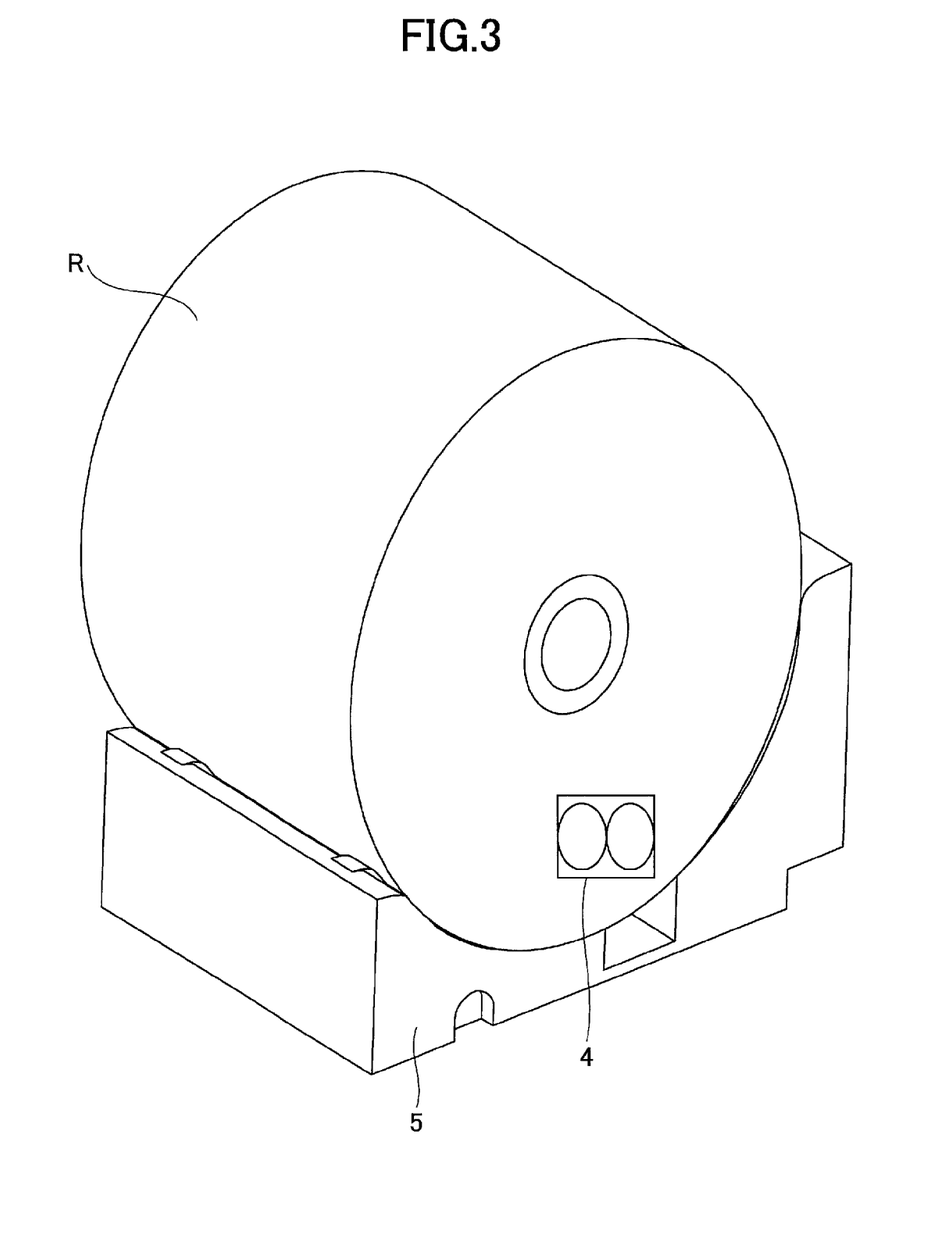
FIG. 3 is an oblique perspective view of a configuration relating to the placement of the photo sensor in the near-end detector apparatus according to the embodiment.

As illustrated in FIG. 2, a printer that includes the near-end detector apparatus 1 of the present embodiment also includes a support unit 5 having a support surface 5a, which is a convex circular arc surface to support the outer circumferential surface of roll paper R. The roll paper R slides on the support surface 5a in a circumferential direction. The printer of the present embodiment includes a side plate 6. In FIG. 2, a print unit, a feed unit, a drive unit, and the like, other than the support unit 5 and the side plate 6, are omitted from illustration. In FIG. 3, the side plate 6 is omitted from illustration.

Although not illustrated, the mechanical switch 3 has a movable member coming in contact with the outer circumferential surface of the roll paper R, an urging spring to urge the movable member against the outer circumferential surface of the roll paper R, and a contact connected to the movable member.

The mechanical switch 3 is situated at a position P3 that is deviated in the circumferential direction from the center of the support unit 5 illustrated in FIG. 2. The mechanical switch 3 asserts an output thereof upon the movable member being pressed by the outer circumferential surface of the roll paper R if the outer diameter of the roll paper R is larger than a predetermined length Rth. If the outer diameter of the roll paper R is smaller than or equal to the predetermined length Rth, the movable member is not urged by the outer circumferential surface of the roll paper R, and thus moves to such a position that the output of the mechanical switch is changed from the on state to the off state.

The position of the movable member coming in contact with the outer circumferential surface of the roll paper R at the position P3 illustrated in FIG. 2 and the characteristics of the spring are adjusted such that the output is changed from the on state to the off state upon the outer diameter of the roll paper R reaching the predetermined outer diameter Rth.

The photo sensor 4 illustrated in FIG. 3 is situated at a position P4 on the side plate 6 as illustrated in FIG. 2. The photo sensor 4 includes a light transmitting part and a light receiving part. The output of the photo sensor 4 is set to HIGH when the light receiving part is receiving reflected light upon the transmission of light from the light transmitting part, and is set to LOW when the light receiving part receives no reflected light.

When the outer diameter of the roll paper R is relatively large, the light emitted from the light transmitting part of the photo sensor 4 is reflected by a flat side face of the roll paper R (i.e., a face perpendicular to the axis of the roll paper R), and the reflected light is detected by the light receiving part to produce a HIGH output. If the outer diameter of the roll paper R is relatively small such that the distance between the inner circumferential surface and the outer circumferential surface is shorter than a predetermined distance Dth, the position of the photo sensor 4 coincides with the center space of the roll paper R. Light emitted from the light transmitting part is thus not reflected by the flat side face of the roll paper R, so that the output is set to LOW.

The light transmission characteristics of the light transmitting part, the light reception characteristics of the light receiving part, and the position P4 of the photo sensor 4 illustrated in FIG. 2 are adjusted such that the output is changed from HIGH (the on state) to LOW (the off state) upon the distance between the inner circumferential surface and the outer circumferential surface of the roll paper R reaching the predetermined distance Dth.

The near-end detector 2a detects the near end of the roll paper R (the fact that the end or exhaustion of the roll paper R is near) in the case of the concurrent occurrences of the off state of the output of the mechanical switch 3 and the LOW state of the output of the photo sensor 4.

In the following, a description will be given of a first mode and a second mode. The first mode is a mode to detect the near end of roll paper R1 that has a core having a diameter Ri. The second mode is a mode to detect the near end of roll paper R2 that has no core and has an inner diameter of Ri' (<Ri).

Figure 4:
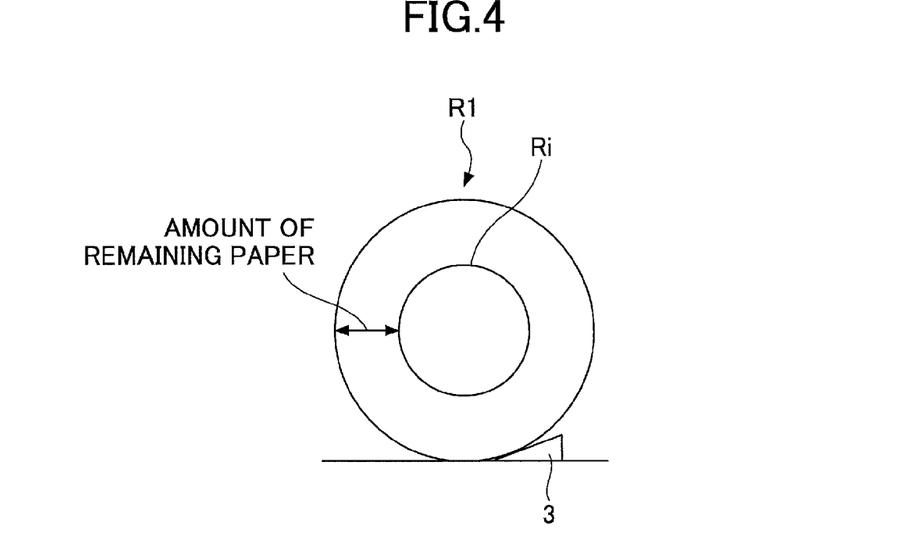
FIG. 4 is a schematic drawing illustrating the detection of roll paper by the mechanical switch of the near-end detector apparatus according to the embodiment.

In the first mode, the outer diameter of the roll paper R1 is sufficiently large when a sufficient amount of paper is remaining. As illustrated in FIG. 4, thus, the outer circumferential surface of the roll paper R1 presses the mechanical switch 3, the output of which is set to the on state. Although not illustrated, the photo sensor 4 detects a flat side face of the roll paper R, so that the output of the photo sensor 4 is set to HIGH.

Figure 5:
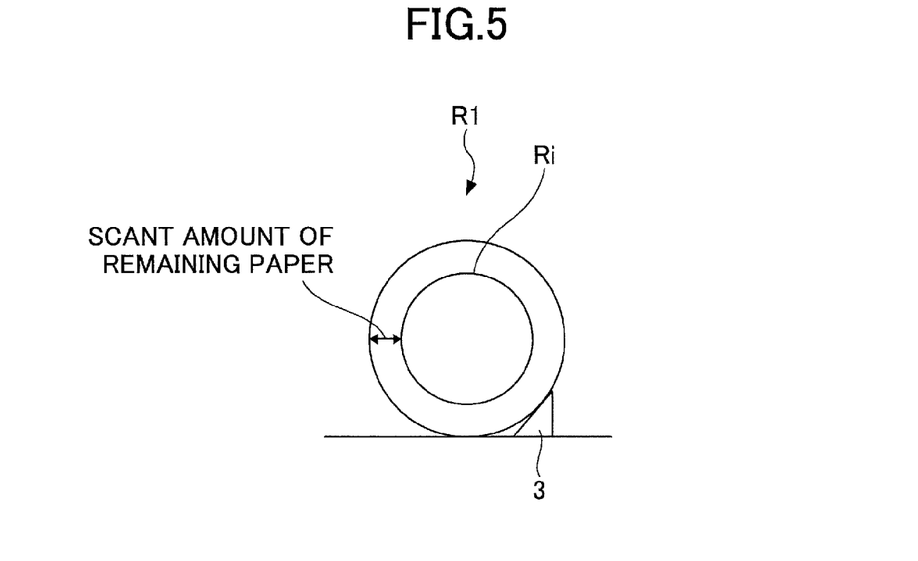
FIG. 5 is a schematic drawing illustrating the detection of roll paper by the mechanical switch of the near-end detector apparatus according to the embodiment.

The roll paper R1 is subsequently consumed, so that the outer diameter of the roll paper R1 becomes relatively small as illustrated in FIG. 5. In this case, the outer circumferential surface of the roll paper R1 does not press the mechanical switch 3, so that the output of the mechanical switch 3 is set to the off state. Further, as illustrated on the left-hand side of FIG. 6, the distance between the inner circumferential surface and the outer circumferential surface of the roll paper R1 is relatively small when a scant amount of paper is remaining. As the inner diameter Ri of the roll paper R1 is large, the flat side face of the roll paper R1 is not in existence within the spatial range detectable by the photo sensor 4. Light emitted from the light transmitting part is not reflected by the flat side face of the roll paper R1, so that the output of the photo sensor 4 is set to LOW. Since the output of the mechanical switch 3 is in the off state and the output of the photo sensor 4 is LOW, the near-end detector 2a detects the near end of the roll paper R1.

Figure 7:
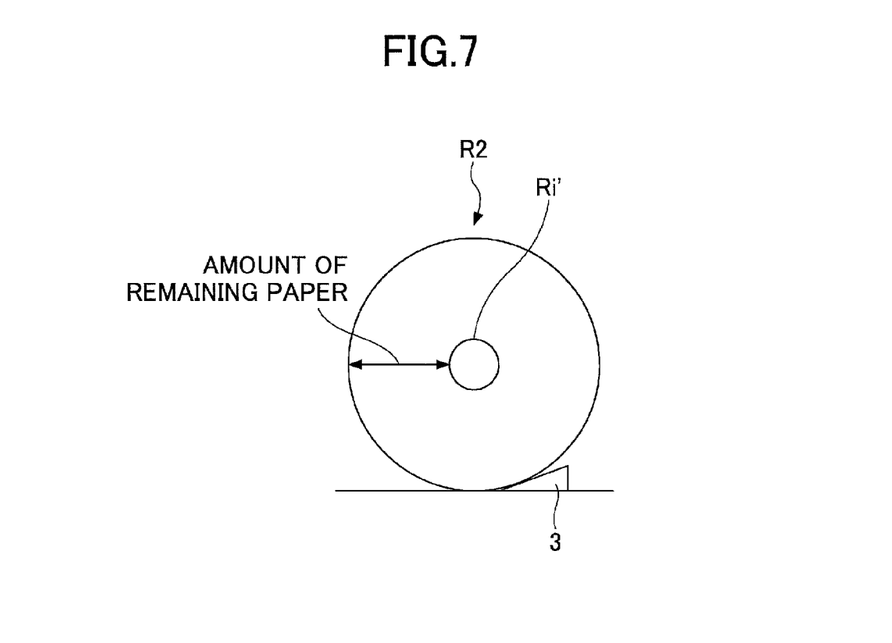
FIG. 7 is a schematic drawing illustrating the detection of roll paper by the mechanical switch of the near-end detector apparatus according to the embodiment.

In the second mode, as illustrated in FIG. 7, the roll paper R2 has an inner diameter Ri' that is smaller than the inner diameter Ri of the roll paper R1. In a condition as illustrated in FIG. 7 in which the outer diameter of the roll paper R2 is relatively large, the mechanical switch 3 is pressed by the outer circumferential surface of the roll paper R2, so that the output of the mechanical switch 3 is set to the on state. If the outer diameter of the roll paper R2 is relatively small, the mechanical switch 3 is not pressed by the outer circumferential surface of the roll paper R2, so that the output of the mechanical switch 3 is set to the off state similarly to the first mode.

Figure 8:
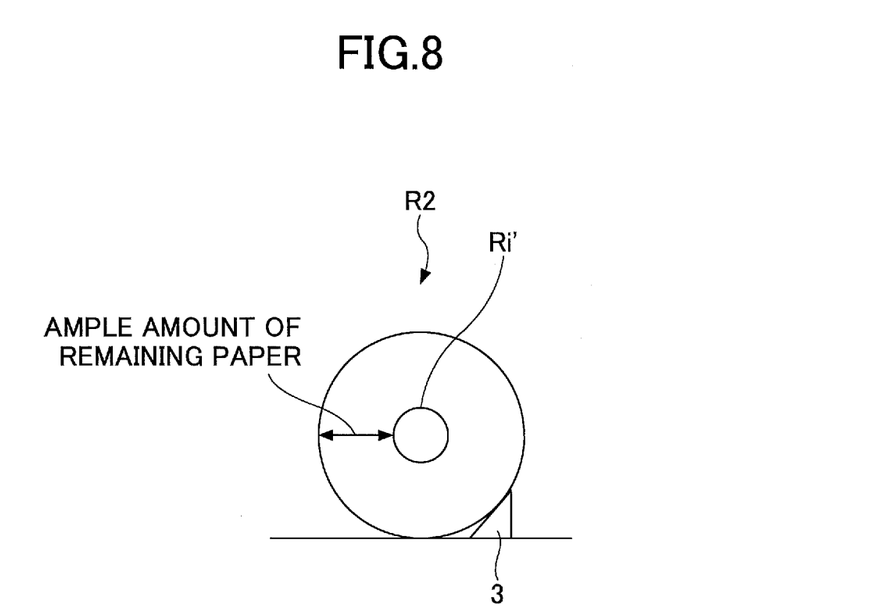
FIG. 8 is a schematic drawing illustrating the detection of roll paper by the mechanical switch of the near-end detector apparatus according to the embodiment.

It should be noted that the inner diameter Ri' of the roll paper R2 is smaller than the inner diameter Ri of the roll paper R1. As illustrated in FIG. 8, an ample amount of paper is still remaining even when the mechanical switch 3 is not pressed by the outer circumferential surface of the roll paper R2. Because of this, a near end should not be detected solely based on the evaluation of the outer diameter.

Figure 6:
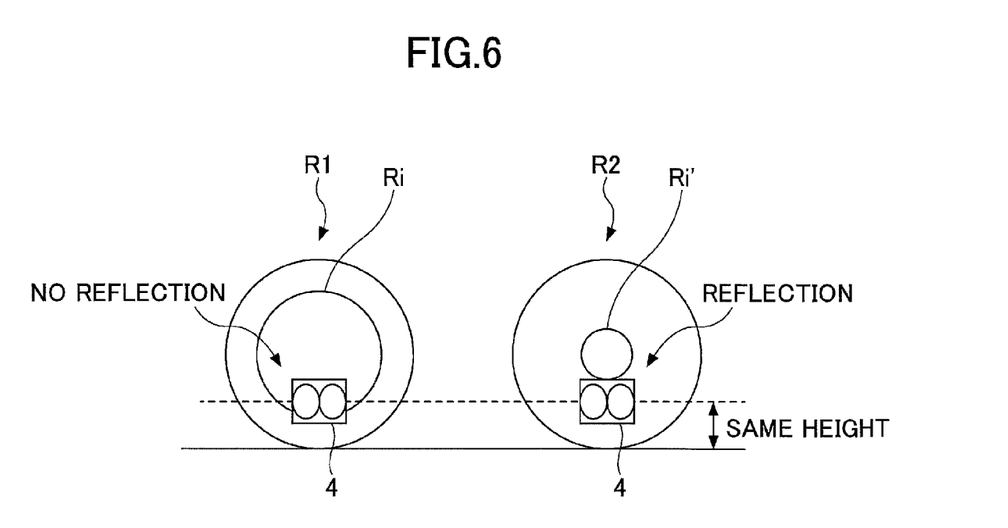
FIG. 6 is a schematic view illustrating different types of detections by the photo sensor of the near-end detector apparatus according to the embodiment.

FIG. 6 illustrates the situation in which the outer diameter of the roll paper R2 illustrated on the right-hand side is approximately equal to the outer diameter of the roll paper R1 illustrated on the left-hand side. Comparison between the roll paper R1 and the roll paper R2 illustrated in FIG. 6 reveals that the amount of paper remaining in the roll paper R2 is larger than the amount of paper remaining in the roll paper R1 because the inner diameter Ri' of the roll paper R2 is smaller than the inner diameter Ri of the roll paper R1. When the roll paper R2 is set to the printer, the light receiving part of the photo sensor 4 receives light reflected from the flat side face of the roll paper R2, resulting in the output of the photo sensor 4 being set to HIGH. Accordingly, the near-end detector 2a does not detect the near end of the roll paper R2 under this condition.

When the roll paper R2 is further consumed from the state illustrated in FIG. 6, the outer diameter of the roll paper R2 decreases, resulting in a reduction in the distance between the outer circumferential surface and the inner circumferential surface. The distance between the outer circumferential surface and the inner circumferential surface of the roll paper R2 eventually becomes equal to the distance between the outer circumferential surface and the inner circumferential surface of the roll paper R1 in a condition as illustrated on the left-hand side of FIG. 6. When this happens, the bottom point of the inner circumferential surface of the roll paper R2 falls below the spatial range detectable by the photo sensor 4, and the light receiving part does not detect light reflected from the flat side face of the roll paper R2, resulting in the output of the photo sensor 4 being low. Since the output of the mechanical switch 3 is already in the off state, the near-end detector 2a detects the near end of the roll paper R upon the occurrence of the LOW output of the photo sensor 4.

Figure 9:
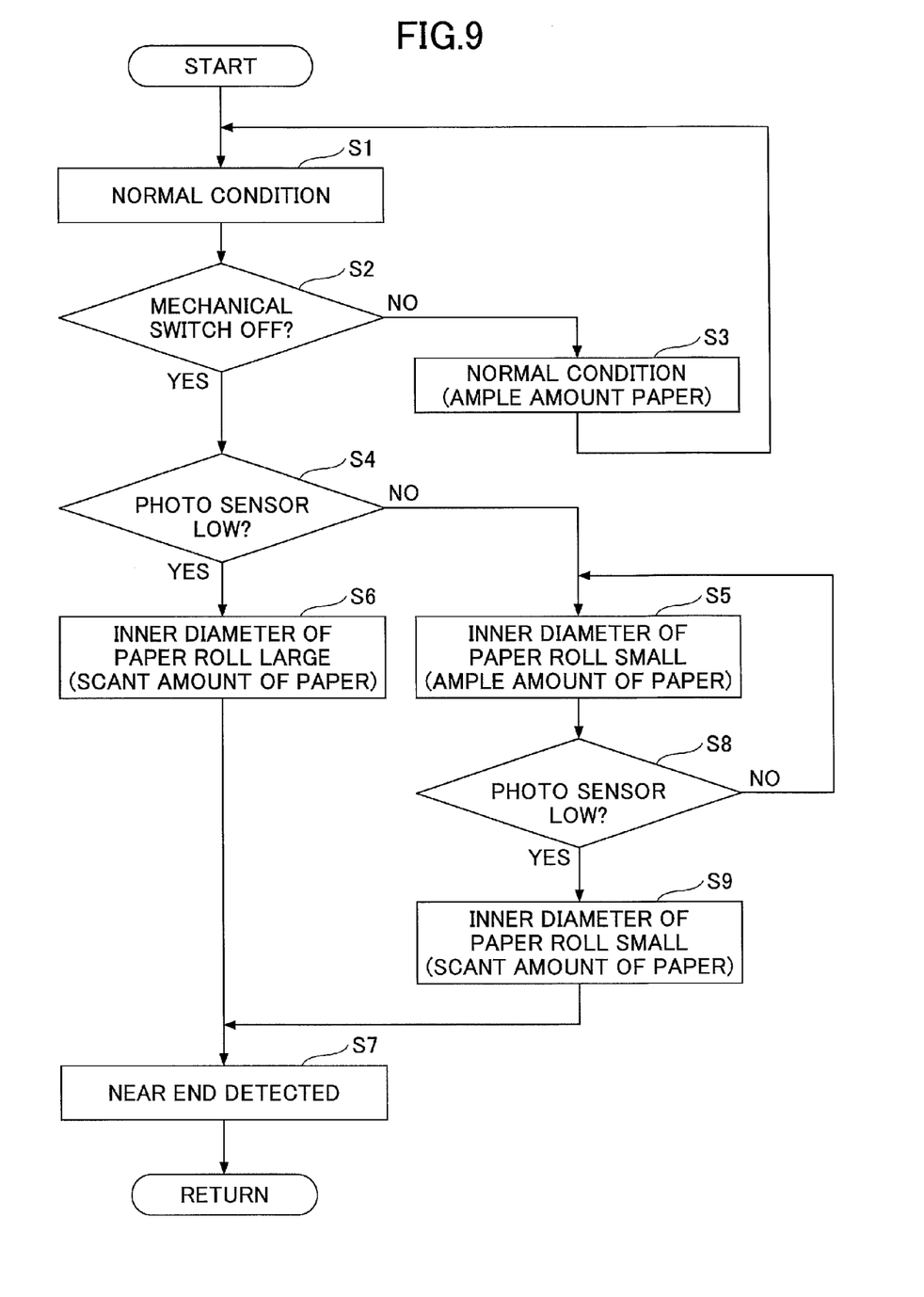
FIG. 9 is a flowchart illustrating the operation of the main control unit of the near-end detector apparatus according to the embodiment.

In the following, the operation of the near-end detector apparatus 1 of the present embodiment will be described with reference to a flowchart illustrated in FIG. 9.

Upon the start of an operation, the near-end detector 2a monitors the outputs of the mechanical switch 3 and the photo sensor 4. In step S1, the near-end detector 2a of the main control unit 2 determines that the roll paper R is in a normal condition (with an ample amount of remaining paper) upon detecting the on state of the mechanical switch 3 and the HIGH state of the photo sensor 4. It may be noted that in step S1, no determination has been made as to whether the roll paper R is a roll paper R1 having a large inner diameter Ri or a roll paper R2 having a small inner diameter Ri'.

In step S2, the near-end detector 2a checks whether the output of the mechanical switch 3 is change from the on state to the off state. In the case of the mechanical switch 3 being in the on state (No in step S2), the near-end detector 2a determines in step S3 that the roll paper R is in the normal condition, and, then, the procedure goes back to step S1. In the case of the mechanical switch 3 being in the off state (Yes in step S2), the near-end detector 2a checks in step S4 whether the output of the photo sensor 4 is LOW.

If the output of the photo sensor 4 is LOW (Yes in step S4), the near-end detector 2a determines in step S6 that the roll paper R is the roll paper R1 having a large inner diameter Ri and that the amount of remaining paper is scant. In step S7, the near-end detector 2a detects the impeding end. In step S7, the display unit 2b may report the detected impeding end to a user by use of a display screen, a lamp, or the like that is provided on the printer to which the near-end detector apparatus 1 is embedded.

If the output of the photo sensor 4 is HIGH (No in step S4), the near-end detector 2a determines in step S5 that the roll paper R is the roll paper R2 having a small inner diameter Ri' and that the amount of remaining paper is large. In subsequent step S8, the near-end detector 2a checks whether the output of the photo sensor 4 is changed from HIGH to LOW, whether the distance between the outer circumferential surface and the inner circumferential surface of the roll paper R2 has become sufficiently small upon the outer diameter of the roll paper R2 being reduced due to paper consumption.

When the output of the photo sensor 4 is HIGH (No in step S8), the flat side face of the roll paper R2 is so situated as to be detectable by the photo sensor 4. The procedure thus returns to step S5 so that the near-end detector 2a determines that the amount of remaining paper is large.

If the output of the photo sensor 4 is LOW (Yes in step S8), the flat side face of the roll paper R 2 is not so situated as to be detectable by the photo sensor 4. In this case, the near-end detector 2a determines in step S9 that the roll paper R2 having a small inner diameter Ri' has a scant amount of remaining paper. In step S7, the near-end detector 2a detects the impeding end. In step S7, the display unit 2b may report the detection of the near end to a user by use of a display screen, a lamp, or the like provided on the printer.

The near-end detector apparatus 1 of the present embodiment described above uses the combination of the output of the mechanical switch 3 and the output of the photo sensor 4 to determine whether the roll paper R is a roll paper R1 having a large inner diameter Ri or a roll paper R2 having a small inner diameter Ri'. This arrangement achieves an accurate detection of a near end by factoring in different roll-paper types.

The embodiments of the present invention have been described heretofore. The present invention is not limited to these embodiments, but various variations and modifications may be made to these embodiments without departing from the scope of the present invention.

For example, the disclosed embodiment has been directed to a case in which the mechanical switch 3 detects the outer diameter of roll paper. Alternatively, the mechanical switch 3 may be configured to detect the weight of roll paper. In such a case, which one of the roll paper R1 illustrated in FIG. 5 and the roll paper R2 illustrated in FIG. 8 is lighter depends on the weight of the core existing in the roll paper R1 illustrated in FIG. 5. The weight of the lighter roll paper is then taken into account to determine a weight Mth that is used as a threshold weight. The characteristics and position of the mechanical switch 3 are adjusted accordingly.

The disclosed technology is directed to a drop-in-type printer that has a support unit configured to support the outer circumferential surface of roll paper, and allows a near end to be accurately detected regardless of the varying size of an inner diameter depending on the type of roll paper. The disclosed technology is implemented by use of the combination of a mechanical switch and a photo sensor as the sensors for detecting a near end. Such a configuration is simple, and does not lead to a cost increase. The disclosed technology is useful in the application to various printers.

The present application is based on and claims the benefit of priority of Japanese priority application No. 2013-197267 filed on Sep. 24, 2013, with the Japanese Patent Office, the entire contents of which are hereby incorporated by reference.

What is claimed is:

1. A detector apparatus, comprising:
   a support unit having a support surface for supporting an outer circumferential surface of a roll;
   a mechanical switch disposed on the support unit to come in physical contact with the outer circumferential surface of the roll to detect a change in an outer diameter or weight of the roll in response to the physical contact;
   a photo sensor disposed on a side plate perpendicular to the support surface of the support unit to detect a change in a relative position of an inner circumferential surface of the roll relative to the support surface by detecting whether or not a side face of the roll is present at a spatial position detectable by the photo sensor; and
   a detector configured to detect a near end of the roll in response to both an output of the mechanical switch and an output of the photo sensor.

2. The detector apparatus as claimed in claim 1, wherein the mechanical switch is configured to change the output thereof from a first state to a second state upon the outer diameter or the weight becoming smaller than a threshold, and the photo sensor is configured to change the output thereof from a third state to a fourth state upon a distance between the inner circumferential surface and the support surface becoming smaller than a predetermined distance.

3. The detector apparatus as claimed in claim 2, wherein the detector is configured to detect the near end upon concurrent occurrences of the second state of the output of the mechanical switch and the fourth state of the output of the photo sensor.

4. The detector apparatus as claimed in claim 2, wherein the detector is configured to detect the near end upon the change of the output of the photo sensor from the third state to the fourth state after the output of the mechanical switch is changed to the second state.

5. A printer, comprising:
a print head;
a feed unit configured to feed roll paper to the print head;
a support unit that supports the roll paper, having a support surface for supporting an outer circumferential surface of the roll paper;
a mechanical switch disposed on the support unit to come in physical contact with the outer circumferential surface of the roll paper to detect a change in an outer diameter or weight of the roll paper in response to the physical contact;
a photo sensor disposed on a side plate perpendicular to the support surface of the support unit to detect a change in a relative position of an inner circumferential surface of the roll paper relative to the support surface by detecting whether or not a side face of the roll paper is present at a spatial position detectable by the photo sensor; and
a detector configured to detect a near end of the roll paper in response to both an output of the mechanical switch and an output of the photo sensor.

6. A detector apparatus, comprising:
a support unit having a support surface that comes in contact with an outer circumferential surface of a roll to support the roll;
a mechanical switch disposed on the support unit to come in physical contact with the outer circumferential surface of the roll to detect a change in an outer diameter or weight of the roll in response to the physical contact;
a photo sensor disposed on a side plate perpendicular to the support surface of the support unit to detect a change in a relative position of an inner circumferential surface of the roll relative to the support surface by detecting whether or not a side face of the roll is present at a spatial position detectable by the photo sensor; and
a detector configured to receive an output of the mechanical switch indicating a first event that the outer diameter or weight of the roll is smaller than a threshold, configured to receive an output of the photo sensor indicating a second event that a distance between an inner circumferential surface of the roll to the support surface is smaller than a predetermined distance, and configured to produce an output indicative of a near end of the roll in response to concurrent occurrences of the first event and the second event.

* * * * *